Jan. 28, 1936.　　　　C. G. BIGELOW　　　　2,029,151
GOGGLE VALVE
Filed Oct. 18, 1934　　　2 Sheets-Sheet 1
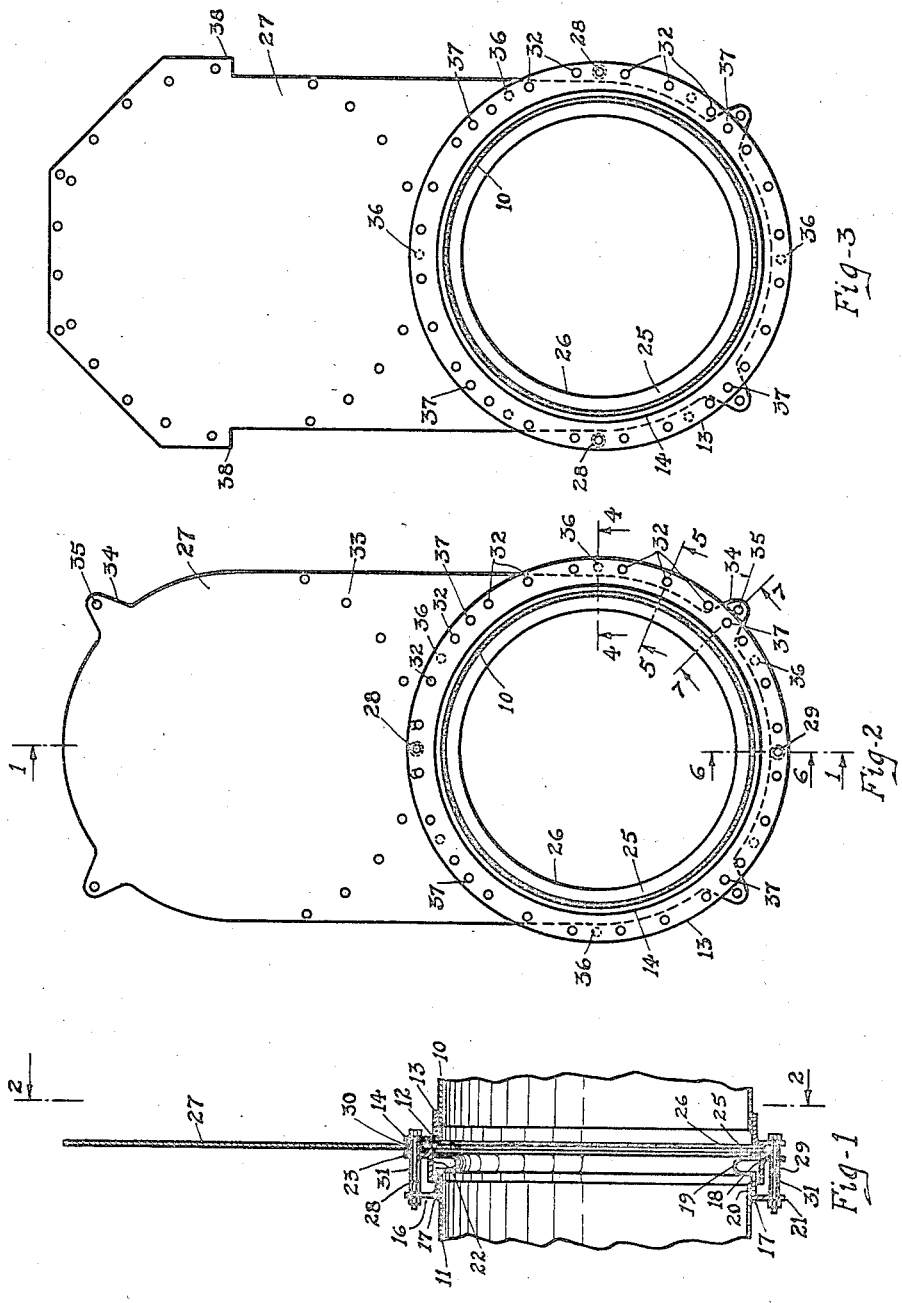
Inventor
Charles G Bigelow.
By - Wilkinson, Huxley, Byron & Knight
Attys.

Jan. 28, 1936.  C. G. BIGELOW  2,029,151

GOGGLE VALVE

Filed Oct. 18, 1934  2 Sheets-Sheet 2

Inventor
Charles G. Bigelow
By- Wilkinson Huxley, Byron + Knight
Attys.

Patented Jan. 28, 1936

2,029,151

UNITED STATES PATENT OFFICE 2,029,151

GOGGLE VALVE

Charles G. Bigelow, Chicago, Ill., assignor to Freyn Engineering Company, Chicago, Ill., a corporation of Maine Application October 18, 1934, Serial No. 748,871

3 Claims. (Cl. 251—167)

The present invention relates to improvements in goggle valves.

For many years there has been used in blast furnace and other installations a design of valve known as a goggle valve. Such valves have been used almost exclusively where it was essential that there be no leakage past the valve when it is in closed position. By the use of a goggle valve the result is obtained that with the valve in closed position, if there be any leakage at all, this leakage will be to the atmosphere and not to the other side of the valve. This type of valve has the disadvantage that when handling an asphyxiating gas, such as blast furnace gas, there is danger that the workmen around the valve when it is being opened or closed may be asphyxiated. In prior practice the amount of leakage to the atmosphere has been considerable. A further disadvantage in prior practice has been that the valves are often very difficult to operate on account of rusting, warping, or other causes.

To overcome the danger of asphyxiation, several types of mechanically operated goggle valves have been proposed, but their cost is excessive and accordingly such designs of valve are used only in positions where the valves must be frequently opened or closed.

An object of the present invention is to provide a goggle valve which is relatively simple in construction, which is tight, and which is easily operated.

A further object is to provide an improved goggle valve having means for loosening said valve in the event that it should stick due to rust or the like.

A further object is to provide an improved goggle valve well adapted to meet the needs of commercial service.

Further objects will appear as the description proceeds.

Referring to the drawings—

Figure 1 is a view in longitudinal section showing an embodiment of the present invention applied to the connection between two pipes, said view being taken along the plane indicated by the arrows 1—1 of Figure 2;

Figure 2 is a view, partly in section, taken along the plane indicated by the arrows 2—2 of Figure 1, said Figure 2 showing a rotating type of goggle valve;

Figure 3 is a sectional view somewhat similar to Figure 2 but showing the sliding type of goggle valve;

Figure 4:
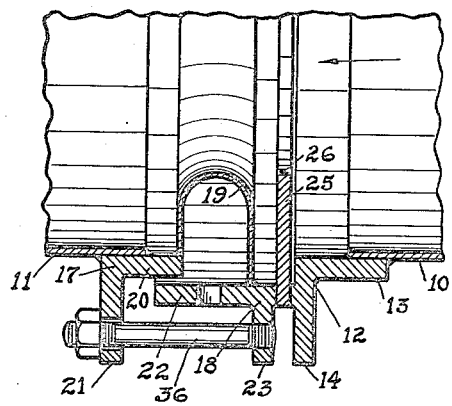
Figure 4 is a fragmentary sectional view, on an enlarged scale, taken along the plane indicated by the arrows 4—4 of Figure 2.

The numerals 10 and 11 indicate two pipes or conduits disposed in alignment with each other. The conduit 10 carries at its end the bracket 12, which includes the cylindrical portion 13 welded or otherwise secured to an end of the conduit 10. The bracket 12 also includes the flange 14 disposed in a plane normal to the axis of the conduit 10. Said bracket 12 comprises an annular valve seat.

The conduit 11 carries at its end a joint assembly 16, which joint assembly is a composite structure made up of the two brackets 17 and 18 and the yieldable member 19 secured to said brackets 17 and 18. The bracket 17 includes a cylindrical portion 20 welded or otherwise secured to the outer surface of the conduit 11. Said bracket 17 also includes the flange 21 disposed in normal relationship with the axis of the conduit 11. The bracket 18 includes the cylindrical portion 22 adapted to be disposed in coaxial relationship with the portion 20. The inside diameter of the portion 22 is slightly greater than the outside diameter of the portion 20, whereby said portion 22 may move longitudinally with respect to the portion 20. Said bracket 18 includes the flange 23 disposed in normal relationship with the axis of the conduit 11. The yieldable member 19 may be described as a fluted annular member, one extremity of said annular member being welded or otherwise secured to the extremity of the cylindrical portion 20 of the bracket 17, the other extremity of said annular member being secured to an intermediate region of the cylindrical portion 22 of the bracket 18. The bracket 18 comprises an annular valve seat opposed to the annular valve seat 12.

The numeral 25 indicate a goggle plate which is adapted to be slid between the flanges 14 and 23 and also adapted to be tightly gripped between said flanges by means which will be described presently. One end of the goggle plate 25 is provided with the port 26, which port is adapted to be positioned coaxially with respect to the conduits 10 and 11 to permit flow of gas from one of said pipes to the other. The other end of said goggle plate 25, which end is indicated by the numeral 27, presents a flat imperforate surface, and when said end is gripped between the flanges 14 and 23, access between the conduit 10 and the conduit 11 will be effectually prevented. The goggle plate 25 may be swung or rotated about a pivot bolt, such a construction being illustrated in Figure 2, or it may be slid with a right line movement, a construction capable of such movement being illustrated in Figure 3.

In describing the goggle valve and its connections, the rotating type of valve shown in Figure 2 will be described with particularity. The small differences in construction involved in Figure 3 will be apparent to those skilled in the art without detailed description.

Figure 6:
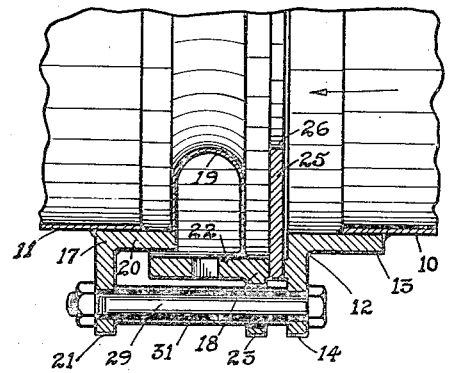
Figure 6 is an enlarged fragmentary view taken along the plane indicated by the arrows 6—6 of Figure 2.

Attention may be directed first to the spacing bolt construction, details of which are illustrated in Figure 6. As shown in Figures 1, 2, and 3, two spacing bolts are provided, which spacing bolts in each of the illustrated embodiments of the present invention are located on a diameter of the flange 14. Said spacing bolts are indicated in Figures 1 and 2 by the numerals 28 and 29 and in Figure 3 by the numerals 28 and 28. Said bolts extend through aligned holes in the flange 14 of the bracket 12 and the flanges 21 and 23 of the joint assembly 16. The bolt 28, which comprises the pivot bolt for the rotating goggle plate 25 in the construction illustrated in Figures 1 and 2, extends through a hole 30 in said goggle plate 25. The hole 30 in the goggle plate 25 and the hole in the bracket 23 are sufficiently large to receive the spacing sleeve 31, the ends of which sleeve are adapted to abut against adjacent faces of the flanges 21 and 14, whereby to limit the extent to which said flanges 21 and 14 may be drawn toward one another. The construction of the spacing bolt 29 and its associated parts is similar to the construction of bolt 28 and its associated parts, except, of course, that bolt 29 and its sleeve 31 do not extend through any hole in the goggle valve 25.

Figure 5:
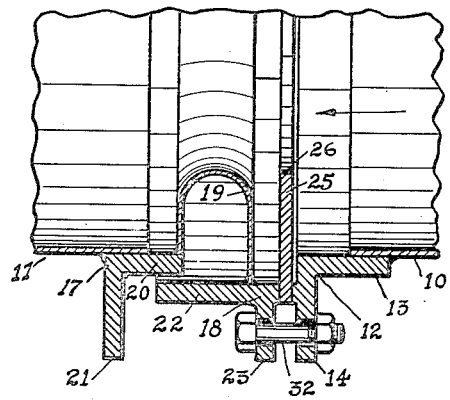
Figure 5 is a fragmentary sectional view on an enlarged scale taken along the plane indicated by the arrows 5—5 of Figure 2.

The flanges 14 and 23 are drawn toward each other by a plurality of flange bolts 32—32, which may be equally spaced around said flanges 14 and 23, extending through aligned holes in said flanges. One of the flange bolts 32—32 is illustrated in Figure 5. It will be understood, of course, that when the goggle plate is to be moved from closed position to open position, or conversely, the flange bolts 32—32 will be removed. The region of the rotating goggle plate 25 adjacent to the spacing bolt 28 may be provided with a plurality of holes 33, through which certain of the flange bolts 32 may be passed when the imperforate end portion 27 of the goggle plate 25 is in position to close access between the conduits 10 and 11. In the construction illustrated in Figure 2, the flange bolts 32—32 in the half circle opposite the spacing bolts 28 are disposed outside of the extremities of the goggle plate, whereby said flange bolts 32—32 exert their pressures upon the flanges 14 and 23 beyond the outlines of said goggle plate 25, said flanges 14 and 23 tightly gripping said goggle plate 25 near one end of said plate when said plate is in closed position and near the other end of said plate when said plate is in open position. Inasmuch as in practical service the goggle plate 25 will be large and heavy, lugs 34—34 are provided on said goggle plate having holes 35 therein through which the goggle plate may be engaged by a grabhook or the like for convenience of manipulation.

In order to operate the yieldable member 19, pulling bolts 36—36 are provided. One of said bolts is illustrated in detail in Figure 4. It will be noted that one extremity of said bolt 36 is threaded into the flange 23, the adjacent head of the bolt 36 being riveted over to effectually prevent the turning out of bolt 36 from the flange 23. The other end of the bolt 36 extends loosely through a corresponding aperture in the flange 21. It will be apparent without detailed explanation that the flanges 23 and 21 may be pulled toward each other by manipulation of the nut on the bolt 36. The member 19 will be given such an original bias that it will tend to spread the flanges 23 and 21 away from each other so that the positions of the flanges 23 and 21 relative to each other may be adjusted as desired.

Figure 7:
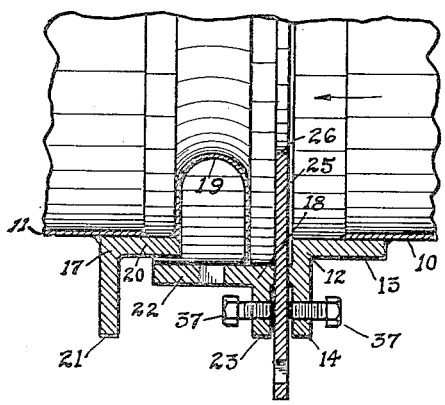
Figure 7 is an enlarged fragmentary view taken along the plane indicated by the arrows 7—7 of Figure 2.

As noted above, a difficulty which is encountered in the operation of goggle valves is that said valves often stick due to rust or the like. The present invention contemplates the provision of cracking bolts for loosening the goggle plate 25 from the flanges 14 and 23. The construction involving said cracking bolts is illustrated in Figure 7, from which it will be noted that bolts 37—37 are carried by the flanges 14 and 23. Said bolts 37 are preferably arranged in pairs, the two bolts in each pair being in alignment with each other. The ends of said bolts are adapted to contact with the side faces of the goggle plate 25. It will be readily understood that by manipulation of the bolts 37—37, the goggle plate 25 may be released from the flanges 14 and 23 in the event that sticking should occur. Said cracking bolts 37—37 should preferably be equi-spaced around the flanges 14 and 23.

The construction shown in Figure 3 will be clear without detailed explanation. The goggle plate 25 shown in Figure 3 is adapted to be slid from open position to closed position and conversely. Said goggle valve is provided with a pair of shoulders 38 adapted to contact with the spacing sleeves of oppositely disposed spacing bolts 28—28. The construction illustrated in Figure 3 is provided with the spacing bolts 28—28, the flange bolts 32—32, the pulling bolts 36—36, and the cracking bolts 37—37, just as in the construction shown in Figure 2.

The mode of operation of the above described embodiments of the present invention will be clear without detailed explanation. When it is desired to move the goggle plate 25 from open position to closed position, or conversely, the flange bolts 32—32 will be removed, the pulling bolts 36—36 will be operated to separate the flanges 14 and 23, the cracking bolts 37—37 being operated if necessary to free the flanges 14 and 23 from the goggle plate 25. If the conduits 10 and 11 should tend to get out of alignment with each other, such action will be prevented by means of the spacing bolts 28 and 29 in the construction illustrated in Figures 1 and 2 and by means of the spacing bolts 28—28 in the construction illustrated in Figure 3. In both of the illustrated constructions, said spacing bolts 28 and 29 may remain in position when the plate is being moved. In the construction shown in Figure 2 the lugs 34—34 will clear the spacing bolt 29 and its sleeve 31 as the goggle plate 28 is swung from open to closed position or conversely. After the goggle plate 25 has been moved to the position desired, the pull of the pulling bolts 36 will be relieved, the cracking bolts 37—37 having been backed off so that they will present no interference to the proper positioning of the flanges 23 and 43 relative to each other. The nuts on flange bolts 32 will then be tightened up.

According to the structure shown in Figure 3, when the goggle plate 25 is dropped to its lowermost position (shown as its closed position), the shoulders 38—38 will rest upon the spacing bolts 28—28.

Though certain embodiments of the present invention have been described in detail, many modifications will occur to those skilled in the art. It is intended to cover all such modifications that fall within the scope of the appended claims.

What is claimed is:

1. In combination, a first pipe, a second pipe, an annular seat secured to said first pipe at one end thereof, an annular bracket secured to said second pipe at an end thereof, an annular collapsible member carried by said bracket and a second annular seat carried by said collapsible member, spacing bolt means cooperating with said first seat and said bracket, a goggle plate movable between said seats, bolts for clamping said goggle valve between said seats, and cracking bolts threaded into said seats for loosening said goggle valve.

2. In goggle valve assembly in combination, a first pipe, a second pipe, a first annular seat secured to an end of said first pipe, an annular bracket secured to an end of said second pipe, an annular member U-shaped in cross section having one leg thereof secured to said bracket, a second annular seat secured to the other leg of said annular U-shaped member, a goggle plate between said seats, flange bolts for clamping said goggle plate between said seats, and a plurality of spacing bolt means for holding said first seat and said bracket in proper spaced relation, said goggle plate having a pair of shoulders adapted to rest upon said spacing bolt means.

3. In goggle valve assembly, in combination, a first pipe, a second pipe, a first annular seat secured to an end of said first pipe, an annular bracket secured to an end of said second pipe, an annular member U-shaped in cross section having one leg thereof secured to said bracket, a second annular seat secured to the other leg of said annular U-shaped member, a goggle plate between said seats, flange bolts for clamping said goggle plate between said seats, a plurality of spacing bolt means for holding said first seat and said bracket in proper spaced relation, pulling bolts cooperating with said bracket and said second seat for controlling the distance between said bracket and said second seat, and cracking bolts carried by said seats for releasing said seats from said goggle plate.

CHARLES G. BIGELOW.